United States Patent [19]
Etoh

[11] Patent Number: 4,621,705
[45] Date of Patent: Nov. 11, 1986

[54] SYSTEM FOR AUTOMATICALLY CONTROLLING VEHICLE SPEED

[75] Inventor: Yoshiyuki Etoh, Yokosuka, Japan

[73] Assignee: Nissan Motor Company, Limited, Japan

[21] Appl. No.: 658,529

[22] Filed: Oct. 9, 1984

[30] Foreign Application Priority Data

Dec. 6, 1983 [JP] Japan ................................. 58-229041

[51] Int. Cl.⁴ ............................................. B60T 7/16
[52] U.S. Cl. ................................. 180/169; 180/170; 340/903; 340/904; 364/424; 364/456; 364/461
[58] Field of Search ........................ 180/167, 168, 169; 364/461, 456, 457, 458, 424; 340/901, 902, 903, 904

[56] References Cited
U.S. PATENT DOCUMENTS

| | | | |
|---|---|---|---|
| 3,689,882 | 9/1972 | Dessailly | 340/903 X |
| 3,725,921 | 4/1973 | Weidman | 180/169 X |
| 3,952,301 | 4/1976 | Sorkin | 364/424 X |
| 4,073,359 | 2/1978 | Fujiki | 180/169 |
| 4,262,335 | 4/1981 | Ahlen | 364/424.1 X |
| 4,439,833 | 3/1984 | Yamaguchi | 180/179 X |

*Primary Examiner*—Harold W. Weakley
*Attorney, Agent, or Firm*—Lane and Aitken

[57] ABSTRACT

In a system and method for automatically controlling a vehicle's speed, the rate of change of the inter-vehicle distance per predetermined unit of time is calculated from the detected inter-vehicle distance between the controlled vehicle and a preceding vehicle, a basic safe inter-vehicle distance is corrected according to the calculated rate of change of the inter-vehicle distance per predetermined time, and the vehicle speed is controlled according to the difference between the corrected safe inter-vehicle distance and the detected inter-vehicle distance.

3 Claims, 5 Drawing Figures

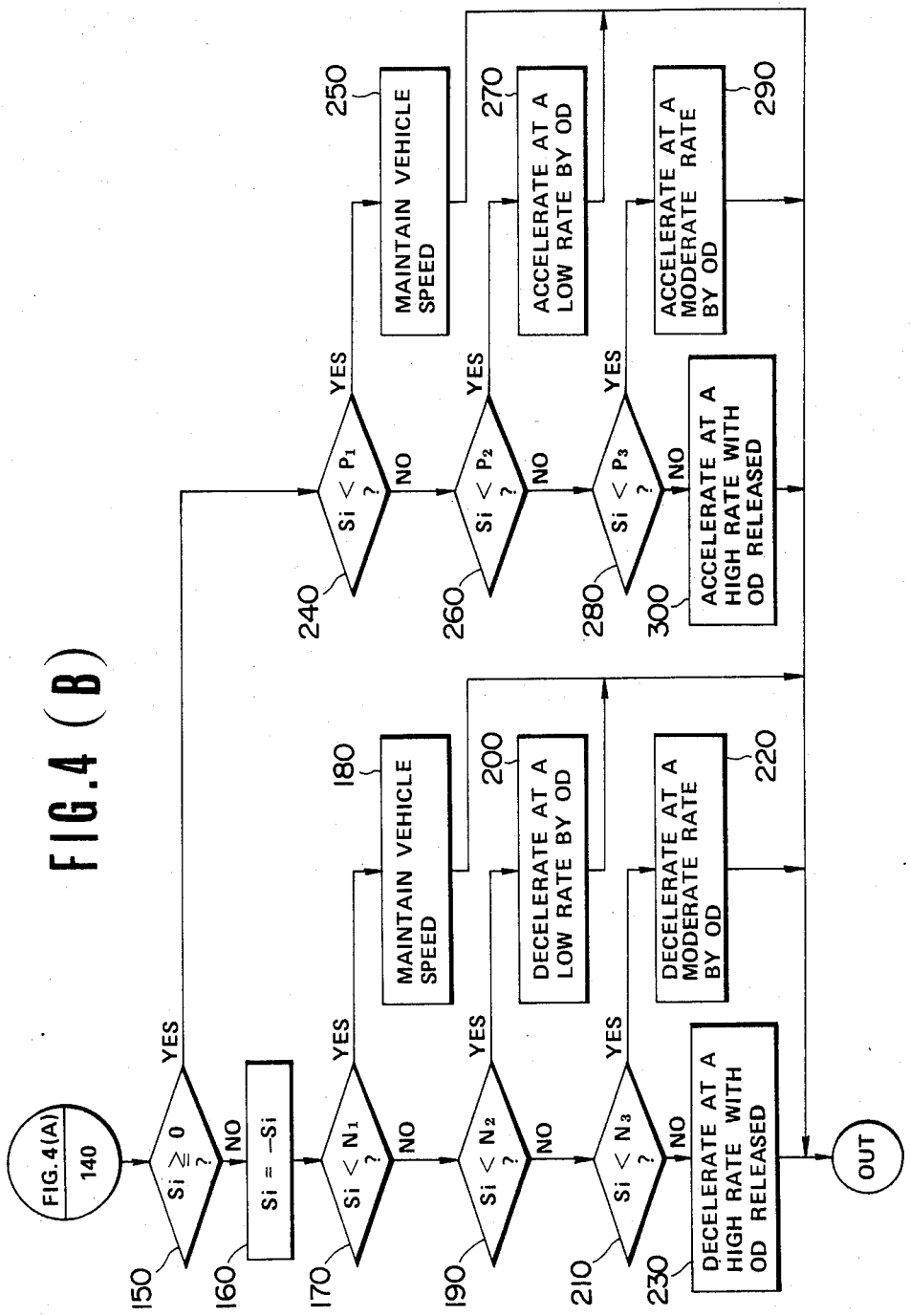

SYSTEM FOR AUTOMATICALLY CONTROLLING VEHICLE SPEED

BACKGROUND OF THE INVENTION

1. Field of the Invention

The present invention relates to a system and method for controlling the cruising speed of a vehicle, particularly to a system and method which achieves good response characteristics to changes in the inter-vehicle distance between the controlled vehicle and another preceding vehicle.

2. Description of the Prior Art

Japanese Patent Application Open No. 55-86000 discloses a system for controlling the vehicle speed at a constant predetermined speed value and at a speed value which is dependent upon the detected distance between the controlled vehicle and a preceding vehicle so that the controlled vehicle can automatically follow the other vehicle.

In the above-identified reference, the disclosed system controls the vehicle speed as described below with reference to FIG. 1. When the inter-vehicle distance D between the vehicle and the preceding vehicle is equal to or greater than a safe inter-vehicle distance value Do related to the set vehicle speed So to which a constant distance value (, e.g., 1 meter) is added (, i.e., Do+1, Do−1 in FIG. 1) used in cruise control operation, the system maintains the vehicle speed if the vehicle speed S is within a preset speed range (for example, 0.5 km/h) with respect to the set vehicle speed So. However, when the vehicle speed S exceeds (So+0.5)km/h as the vehicle rolls down a slope, the system actuates a throttle valve to throttle down by an angle, i.e., deceleration rate $\Delta\theta$ proportional to the speed differential $\Delta S$ (for example, 3$\Delta S$) in order to return the vehicle speed to the set speed So. Conversely, when the vehicle speed S drops below (So−0.5)km/h as the vehicle ascends a slope, the system opens the throttle valve through an angle which represents a desired acceleration rate $\Delta\theta$ and which is proportional to the speed differential $\Delta S$ (for example 3$\Delta S$) in order to accelerate the vehicle toward the set speed So. When the vehicle speed S is below (So−5)km/h, the system accelerates the vehicle at a constant acceleration rate $\Delta\theta$ (for example 2°).

On the other hand, when the measured inter-vehicle distance is more than about a meter below the safe inter-vehicle distance value Do, the system decelerates the vehicle at a constant deceleration rate $\Delta\theta$ (for example 3°). Since the safe inter-vehicle distance Do decreases as the vehicle speed S is reduced by the cruise control system, the vehicle will soon be trailing the preceding vehicle at a safe distance and at approximately the same vehicle speed. When the inter-vehicle distance D between the two vehicles is within a preselected range of the safe inter-vehicle distance Do hereinafter referred to as a dead zone; speed control is not carried out.

In the above vehicle cruising control system the vehicle speed is increased or decreased in accordance with a safe inter-vehicle distance value Do derived solely on the basis of the vehicle speed. That is to say, the conventional system performs the control over the vehicle speed merely according to the difference between the periodically-measured inter-vehicle distance D and the safe inter-vehicle distance as shown in FIG. 1 without taking the vehicle speed of the preceding vehicle into consideration. Therefore, in cases where the vehicle speed of the preceding vehicle is significantly lower than that of the trailing, controlled vehicle which is therefore abruptly approaching the preceding vehicle, the time at which the cruise control system begins to decelerate the vehicle is so late that the driver needs to apply the brakes himself. On the other hand, in cases where the vehicle is following another vehicle at a constant safe inter-vehicle distance Do and the other vehicle abruptly accelerates so that it quickly moves away from the vehicle, the controlled vehicle will not promptly begin to accelerate so that the inter-vehicle distance will become greater than necessary; in other words, the vehicle will not suitably accommodate traffic flow.

SUMMARY OF THE INVENTION

It is an object of the present invention to provide a system and method for automatically controlling vehicle speed with improved response characteristics to changes in the distance between the controlled vehicle and a preceding vehicle. To achieve the above-described object, the system according to the present invention controls the vehicle speed as shown in FIG. 2; specifically, in such a way that a safe inter-vehicle distance is obtained by means of a safe inter-vehicle distance calculating means 3 according to the vehicle speed detected by vehicle speed detecting means 1 and a rate of change of inter-vehicle distance per predetermined unit of time is obtained by means of an inter-vehicle distance change rate calculating means 7 on the basis of an output of an inter-vehicle distance detecting means 5, the safe inter-vehicle distance is corrected according to the rate of change in the inter-vehicle distance by means of a safe inter-vehicle distance correction calculating means 11, and vehicle speed controlling means 13 controls the vehicle speed according to the difference in distance between the corrected safe inter-vehicle distance and the actual inter-vehicle distance detected by the inter-vehicle distance detecting means 5.

BRIEF DESCRIPTION OF THE DRAWINGS

A more complete understanding of the present invention may be obtained from the foregoing description and attached drawings in which like reference numerals designate the same elements and in which.

DETAILED DESCRIPTION OF THE EMBODIMENTS

Reference will hereinafter be made to the drawings in order to facilitate understanding of the present invention.

Figure 1:
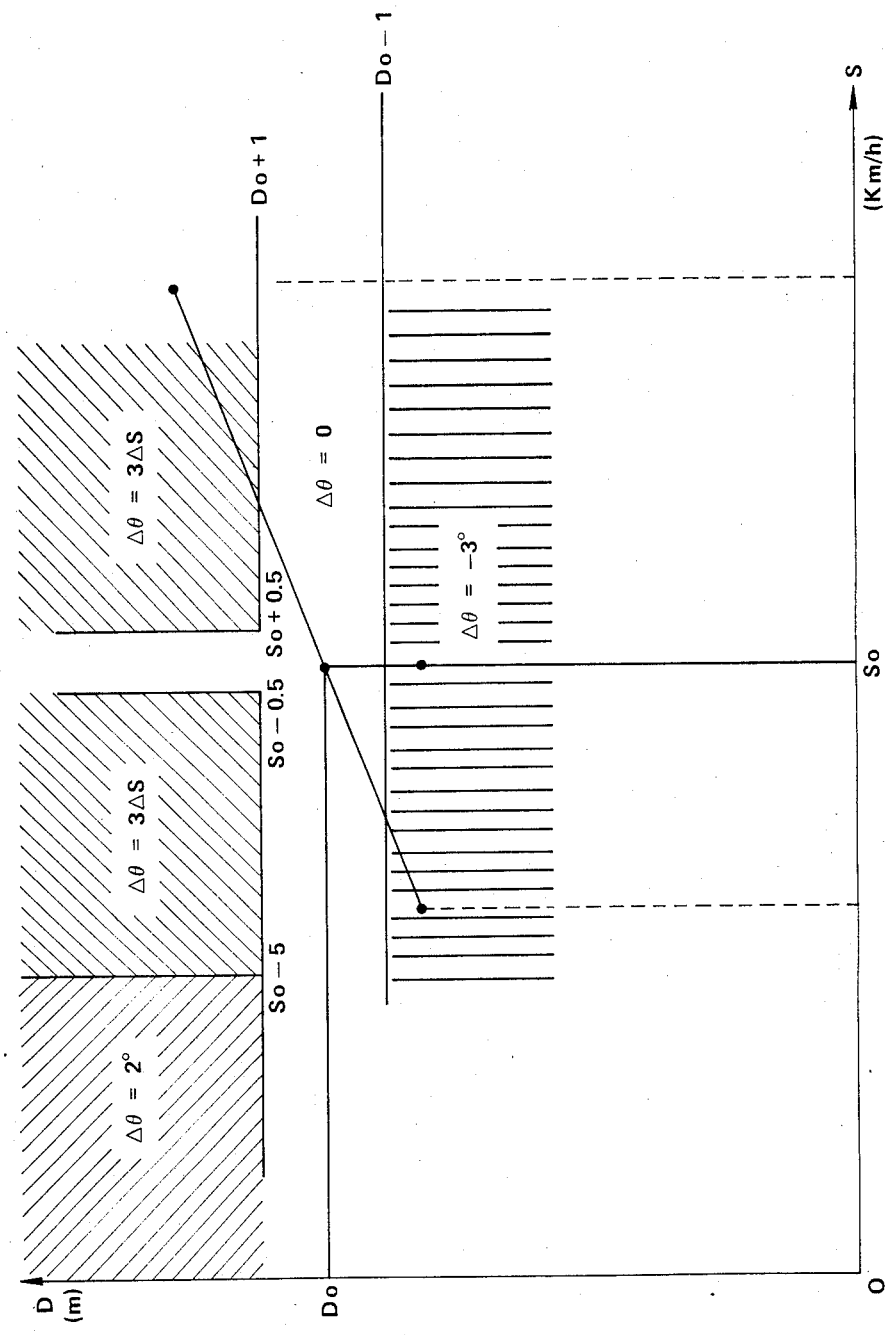
FIG. 1 is a diagram of control concepts of a conventional system for automatically controlling vehicle speed.
Figure 2:
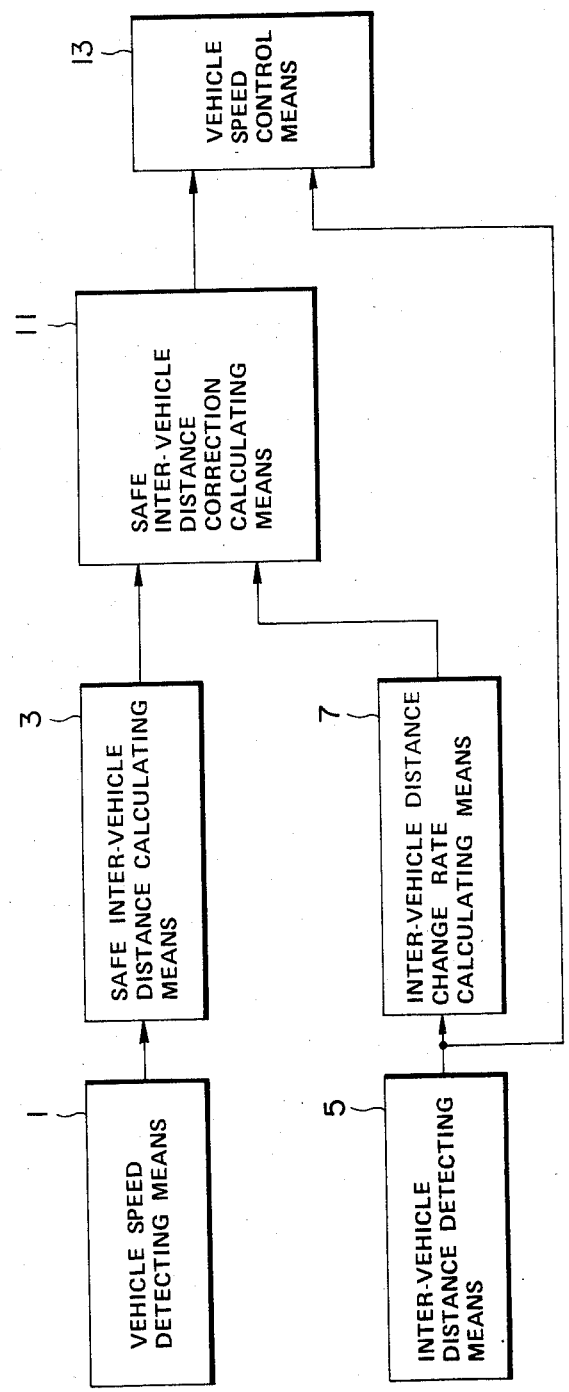
FIG. 2 is a functional block diagram of the system according to the present invention.
Figure 3:
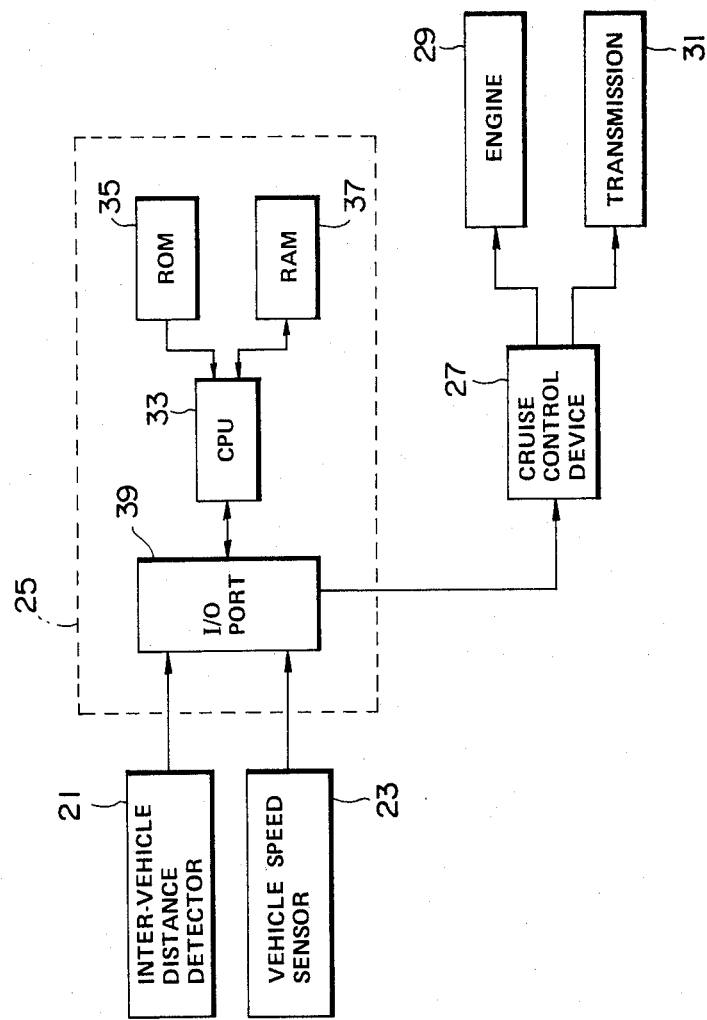
FIG. 3 is a simplified block diagram of the system of a preferred embodiment of the present invention.

FIG. 3 is a circuit block diagram showing a preferred embodiment of the present invention.

In FIG. 3, numeral 21 denotes an inter-vehicle distance detector using an electromagnetic wave, ultrasonic wave, or light beam for detecting the inter-vehicle distance between a first vehicle and a second vehicle (first vehicle refers to the vehicle on which the detector 21 is mounted and to which the system is applied and second vehicle refers to another preceding vehicle which is running just in front of the first vehicle), numeral 23 denotes a vehicle speed sensor for detecting the vehicle speed of the first vehicle, numeral 25 denotes a microcomputer which receives output signals from the inter-vehicle distance detector 21 and vehicle speed sensor 23, executes a series of processes, to be described later, on the basis of the output signals from the above-described detectors 21 and 23, and outputs an acceleration or deceleration command signal to a cruise control device 27 for controlling the speed of the first vehicle. The cruise control device 27 controls an engine 29, specifically a throttle valve opening angle, and transmission 31, specifically an over drive solenoid valve to be described later, according to the acceleration or deceleration command signal from the microcomputer 25 so as to govern the first vehicle's speed. It should be noted that the microcomputer 25 comprises a Central Processing Unit (CPU) 33, Read Only Memory (ROM) 35, Random Access Memory (RAM) 37, and Input Output Port I/O PORT 39, these units being interconnected. The inter-vehicle distance detector 21 is exemplified in Japanese Patent Application Open No. 55-86000, in which a radar unit which emits an electromagnetic wave of a predetermined wave length toward a forward direction of the vehicle and receives a reflected wave of the wave transmitted therefrom is used as the inter-vehicle distance detector. Such an inter-vehicle distance detector is well known as disclosed in U.S. Pat. No. 3,689,882, and U.S. Pat. No. 3,952,301.

Figure 4:
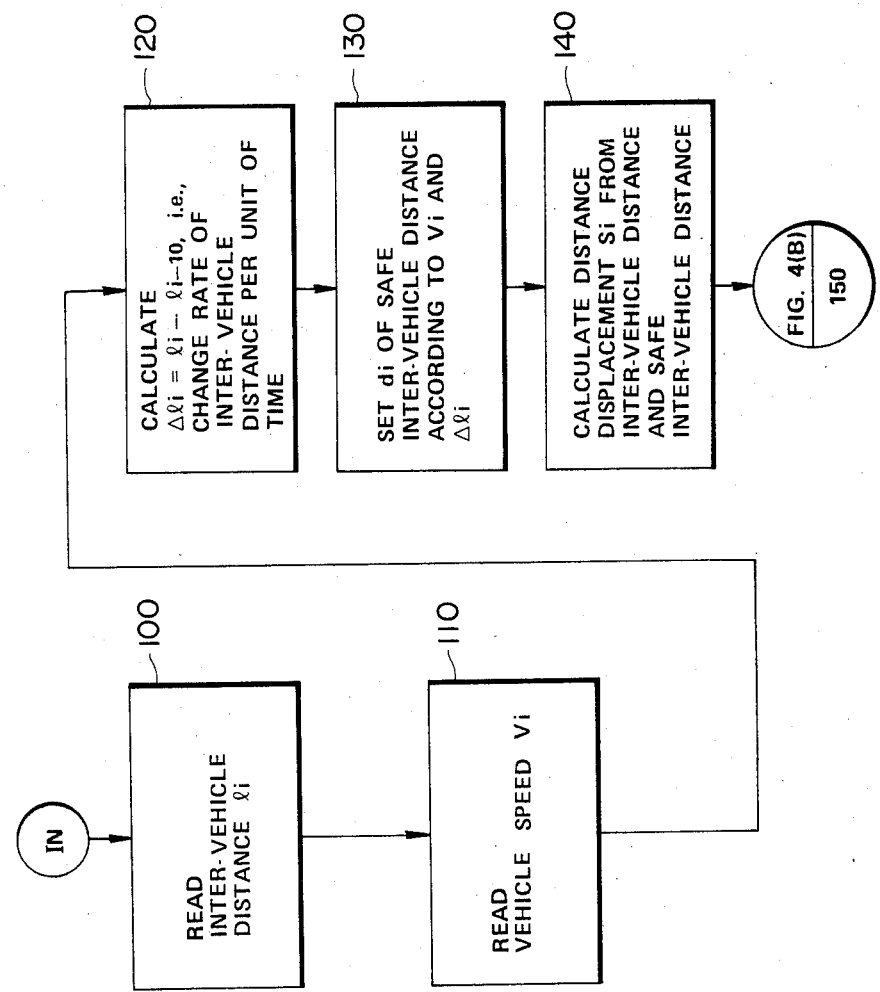
FIGS. 4(A) and 4(B) are integrally an operational flowchart executed by the system shown in FIG. 3.

The operation of the above-constructed preferred embodiment will be described with reference to an interrupt processing flowchart shown in FIGS. 4(A) and 4(B) which is executed by the CPU 3 after every fixed unit of time i (for example, 100 milliseconds). It should be noted that the first vehicle has an automatic transmission with overdrive (OD) mechanism.

In a step 100, the CPU 3 reads the current inter-vehicle distance value li and, in a step 110, the CPU 3 reads the current vehicle speed value Vi from the respective detectors 21 and 23. In a step 120, the CPU 3 calculates a rate of change of the inter-vehicle distance per unit of time (for example, one second) $\Delta li$ by comparing the current value of the inter-vehicle distance li with the previous value thereof $l_{i-10}$ fetched from the RAM 37. In a step 130, a safe inter-vehicle distance di is calculated according to the calculated rate of change of the inter-vehicle distance per unit of time $\Delta li$ and the detected value of the first vehicle's speed Vi from the following:

$$di = f(Vi) + g(\Delta li)$$

wherein
$f(Vi) = Vi^2/100$,
$g(\Delta li) = Ki \cdot \Delta li$ (Ki: positive constant).

In this Equation, f(Vi) denotes an incremental function of Vi and is a basic safe inter-vehicle distance according to the first vehicle's speed Vi. In addition, $g(\Delta li)$ denotes an incremental function of the rate of change in the inter-vehicle distance $\Delta li$ with a positive or negative sign and is a corrective term for the safe inter-vehicle distance related to the vehicle speed of the second vehicle.

In summary, the safe inter-vehicle distance di is calculated in the following way. When the speed of the second vehicle equals that of the first vehicle, the rate of change of the inter-vehicle distance $\Delta li$ is essentially zero. Therefore, the safe inter-vehicle distance di is dependent on the basic safe inter-vehicle distance f(Vi). In cases where the first vehicle abruptly decelerates so that the inter-vehicle distance decreases rapidly, the safe inter-vehicle distance di is increased by the corrective terms $g(\Delta li)$ of the safe inter-vehicle distance di according to its deceleration rate $\Delta li$. Conversely, in cases where the inter-vehicle distance is increased due to the abrupt acceleration of the second vehicle, the safe inter-vehicle distance di is decreased by the safe inter-vehicle distance corrective term $g(\Delta li)$. Hence, speed control according to a difference Si between the corrected safe inter-vehicle distance di and detected inter-vehicle distance li implies speed control according to changes in the inter-vehicle distance.

In a step 140, the difference between the detected inter-vehicle distance li and the calculated safe inter-vehicle distance di is obtained, i.e., the displacement Si of the actual inter-vehicle distance li from the safe inter-vehicle distance di, and the routine goes to step 150 to control the first vehicle speed according to the obtained displacement Si.

In a step 150, the CPU determines whether the sign of the displacement Si is positive or negative. If Si<0, the first vehicle is approaching the second vehicle. After the absolute value of the displacement Si is obtained (step 160), the CPU executes steps (170 through 230) to perform a decelerating speed control in accordance with the absolute value of the displacement Si. On the other hand, if $S \geq 0$ in the step 150, the second vehicle is moving away from the first vehicle so the CPU executes steps (240 through 300) to perform an accelerating speed control in accordance with the displacement Si.

In the step 160, the absolute value Si is obtained and in the steps 170 through 230 the absolute value of the displacement Si is compared with basic displacement values $N_1$, $N_2$, and $N_3$ to identify a proper vehicle speed control regime for maintaining or decreasing vehicle speed as shown in table 1 below.

TABLE 1

| Si | $|Si|<N_i$ | $N_1 \leq |Si| < N_2$ | $N_2 \leq |Si| < N_3$ | $N_3 \leq |Si|$ |
|---|---|---|---|---|
| First vehicle speed control | Maintain the first vehicle speed | Decelerate at a low rate with an aid of OD | Decelerate at a middle rate with the aid of OD | Decelerate at a high rate with the aid of OD release |

OD denotes overdrive of the automatic transmission.

In other words, as the absolute value of the displacement Si increases, i.e., as the approach of the first vehicle to the second vehicle is made at higher and higher speeds, the rate of deceleration of the first vehicle must increase. It should be noted that the basic displacements $N_1$, $N_2$, and $N_3$ are previously set to conform to the dynamic characteristics of the engine and transmission.

In the case of $Si \geq 0$ in the step 150, the CPU executes the steps 240 through 300 in which the vehicle speed of the first vehicle is maintained or increased according to the differences between the displacement Si and the basic displacements $P_1$, $P_2$, and $P_3$.

TABLE 2

| Si | $Si<Pi$ | $P_1 \leq Si < P_2$ | $P_2 \leq Si < P_3$ | $P_3 \leq Si$ |
|---|---|---|---|---|
| First vehicle speed control | Maintain the first vehicle speed | Accelerate at a low rate with the aid of | Accelerate at a middle rate with the aid of | Accelerate at a high rate with the aid of |

TABLE 2-continued

| Si | Si<Pi | P₁≤Si<P₂ | P₂≤Si<P₃ | P₃≤Si |
|---|---|---|---|---|
| | | OD | OD | OD release |

It should be noted that the basic displacements $P_1$, $P_2$, and $P_3$ are previously set values to conform to the dynamic characteristics of the engine and transmission.

In other words, as the displacement Si increases, i.e., as the second vehicle moves away from the first vehicle at higher and higher speeds, the rate of acceleration of the first vehicle must increase. The vehicle speed maintenance control signal, deceleration control signal, or acceleration control signal to be outputted to the conventional cruise control device 27, as a result of the steps 170 through 300, may be achieved by applying an ON/OFF signal across terminals of a "manual acceleration switch", terminals of a "set switch", and terminals of OD release solenoid provided for the automatic transmission.

Specifically, since the conventional cruise control device 27 has the manual accelerate switch and set switch and the automatic transmission has an OD release solenoid valve, a switching circuit may be provided across both terminal of each switch and OD release solenoid. Therefore, the switching circuit closes or opens each switch and OD solenoid valve according to the command from the I/O port 39 of the microcomputer, i.e., the vehicle maintenance control signal, deceleration control signal, or acceleration control signal as shown in Tables 1 and 2.

It should be noted that although in this embodiment the cruise control device 27 is used as an example of the acceleration/deceleration control mechanism, another type of the acceleration/deceleration mechanism may be used wherein the angular position of a throttle valve is directly controlled.

Although in the step 130 the safe inter-vehicle distance di is given as a quadratic function of the veicle speed Vi of the first vehicle, the safe inter-vehicle distance di may be, e.g., a linear function of the vehicle speed if it is an incremental function of the first vehicle speed Vi.

Similarly, although g(Δli) is a linear function of the amount of change in the inter-vehicle distance Δli, it may be, e.g., a quadratic function as shown in the following equation if it is an incremental function of the amount of change Δli $$g(\Delta li) = K_2 \cdot \Delta li \cdot |\Delta li|$$

($K_2$: positive constant)

As described hereinabove, since the vehicle speed control system according to the present invention corrects the safe inter-vehicle distance according to the vehicle speed of the first vehicle in accordance with the rate of change in the inter-vehicle distance per predetermined unit of time and the vehicle speed of the first vehicle is controlled according to the difference between the measured inter-vehicle distance and the corrected derived inter-vehicle distance, the response characteristics of the first vehicle speed control to changes in the inter-vehicle distance are improved. That is to say, when the first vehicle approaches the second vehicle, which is moving significantly slower than the first vehicle, the reduction of the vehicle speed as the vehicle approaches the basic safe inter-vehicle distance becomes timely and smooth. Similarly, after the first vehicle has started to track the second vehicle at the basic safe inter-vehicle distance, as the second vehicle changes speed, the adjustment of the vehicle speed of the first vehicle to match that of the second vehicle at the new safe inter-vehicle distance will be prompt and smooth. Consequently, safe and comfortable automatic cruising can be achieved in conformity with the flow of surrounding traffic.

It will clearly be understood by those skilled in the art that the foregoing description is made in terms of the preferred embodiment and various changes and modifications may be made without departing from the scope and spirit of the present invention, which is to be defined by the appended claims.

What is claimed is:

1. A system for automatically controlling the speed of a vehicle, comprising:
    (a) means for detecting vehicle speed and outputting a first signal indicative thereof;
    (b) means for calculating a safe inter-vehicle distance between the controlled vehicle and another vehicle preceding same on the basis of the vehicle speed detected by said vehicle speed detecting means;
    (c) means for detecting the actual inter-vehicle distance between the vehicle and the preceding vehicle and outputting a second signal indicative thereof;
    (d) means responsive to the second signal for calculating the rate of change of the inter-vehicle distance per predetermined unit of time;
    (e) means for correcting the calculated safe inter-vehicle distance according to the rate of change of inter-vehicle distance calculated by said inter-vehicle change rate calculating means; and
    (f) means for controlling the vehicle speed according to the difference between the corrected safe inter-vehicle distance and the detected actual inter-vehicle distance, said vehicle speed controlling means selecting a rate of change of increase of the vehicle speed from a plurality of predetermined values when the difference between the corrected safe inter-vehicle distance and the actual vehicle distance increases and selecting a rate of change of decrease of the vehicle speed from among a plurality of predetermined values when the difference between the corrected safe inter-vehicle distance and the actual inter-vehicle distance decreases, the selected rate of increase or decrease in vehicle speed being detected by determining in which of a plurality of predetermined ranges the difference between the actual and corrected safe inter-vehicle distance lies, said vehicle speed controlling means controlling the vehicle speed together with an overdrive solenoid valve of an automatic transmission of the vehicle released when determining that an absolute value of the difference between the actual and corrected safe inter-vehicle distance is within or greater than a maximum one of said predetermined ranges.

2. The system as set forth in claim 1, wherein the predetermined ranges are selected on the basis of the dynamic characteristics of the vehicle's engine and transmission.

3. The system as set forth in claim 1, wherein said vehicle controlling means maintains the vehicle speed unchangedly when determining that an absolute value of the difference between the actual and corrected safe inter-vehicle distance is below a minimum one of said plurality of said predetermined values.

* * * * *